United States Patent [19]
Terhune et al.

[11] Patent Number: 5,590,162
[45] Date of Patent: Dec. 31, 1996

[54] STAND-ALONE POWER SUPPLY ENERGIZED BY DECAY OF RADIOACTIVE IOSTOPE

[75] Inventors: James H. Terhune, San Jose; Barry M. Gordon, Monte Sereno, both of Calif.

[73] Assignee: General Electric Company, San Jose, Calif.

[21] Appl. No.: 505,727

[22] Filed: Jul. 21, 1995

Related U.S. Application Data

[63] Continuation-in-part of Ser. No. 384,997, Feb. 7, 1995, which is a continuation-in-part of Ser. No. 239,773, May 9, 1994, Pat. No. 5,444,747.

[51] Int. Cl.⁶ .................................................. G21D 7/00
[52] U.S. Cl. ..................... 376/320; 376/321; 376/191; 376/196; 376/158; 376/317
[58] Field of Search .................................. 376/321, 191, 376/196, 158, 317, 320; 310/305, 308

[56] References Cited

U.S. PATENT DOCUMENTS

| | | | |
|---|---|---|---|
| 2,847,585 | 8/1958 | Christian | 376/320 |
| 3,302,024 | 1/1967 | Edling et al. | 250/106 |
| 3,638,018 | 1/1972 | Gasper | 250/83.1 |
| 3,917,509 | 11/1975 | Fisher et al. | 376/321 |
| 3,934,162 | 1/1976 | Adler et al. | 310/305 |
| 4,024,410 | 5/1977 | Dahlberg | 307/2 |
| 4,024,420 | 5/1977 | Anthony et al. | 310/3 B |
| 4,373,375 | 2/1983 | Terhune et al. | 73/19 |
| 4,489,269 | 12/1984 | Edling et al. | 322/2 R |
| 5,008,579 | 4/1991 | Conley et al. | 310/303 |
| 5,111,099 | 5/1992 | Smith | 310/305 |
| 5,235,232 | 8/1993 | Conley et al. | 310/303 |
| 5,396,141 | 3/1995 | Jantz et al. | 310/303 |
| 5,464,706 | 11/1995 | Dasgupta et al. | 429/194 |

*Primary Examiner*—Charles T. Jordan
*Assistant Examiner*—Meena Chelliah
*Attorney, Agent, or Firm*—James E. McGinness

[57] ABSTRACT

A stand-alone low-voltage direct current power supply, for use as a battery, which is energized by the decay of a radioactive isotope in response to neutron capture. During this decay, either α- or β-particles are emitted. The emitting radioactive isotope should have adequate half-life and no γ-emission. The preferred β-emitting radioisotope is thallium, which decays directly to the ground state of $Pb^{204}$ by 763-keV β-decay with no γ-emission. The resulting β-particles are collected to form a current which can be used for various purposes inside a reactor. The preferred α-emitting radioisotope is americium.

6 Claims, 2 Drawing Sheets

STAND-ALONE POWER SUPPLY ENERGIZED BY DECAY OF RADIOACTIVE IOSTOPE

RELATED PATENT APPLICATIONS

This application is a continuation-in-part application of U.S. patent application Ser. No. 08/384,997 filed on Feb. 7, 1995, which in turn is a continuation-in-part application of U.S. patent application Ser. No. 08/239,773 filed on May 9, 1994, U.S. Pat. No. 5,444,747 issued on Aug. 22, 1995.

FIELD OF THE INVENTION

This invention generally relates to stand-alone means for generating low-power direct current or voltage.

BACKGROUND OF THE INVENTION

FIG. 1 shows an apparatus, disclosed in U.S. patent application Ser. No. 08/384,997, for electrically suppressing the electrochemical potential (ECP) near a BWR component which is susceptible to intergranular stress corrosion cracking (IGSCC). The apparatus is a self-contained means of locally protecting critical portions of metals, such as welds, by suppressing ECP in the immediate vicinity of that portion of the metal requiring protection in operating BWR plants.

The apparatus shown in FIG. 1 is based on the concept of supplying electrons directly and locally to the surface of a sensitized metallic structural member 2, as in the case of the heat affected zone 6 of a weld 4, thereby inhibiting IGSCC. The electrical system depicted in FIG. 1 is capable of supplying sufficient electrons to the metal surface to inhibit the corrosion reaction due to local ECF exceeding the threshold value at which IGSCC can occur.

In the circuit of FIG. 1, the center electrical conductor of a small mineral-insulated steel sheathed cable 16 is attached to the metal surface to be protected against IGSCC and connected to an electrical control circuit 10 that operates off the low-voltage DC power supply 20. The control circuit 10 and DC power supply 20 are enclosed in a housing 8 made of material able to withstand thermal and radiological conditions inside a boiling water reactor, but outside the reactor core. The passive conductor of a twisted-shielded pair of cable conductors is connected to a reference electrode 18 located in the oxidizing coolant near the metal surface and to a terminal of the control circuit. The current collected at the metal surface is controlled by the applied voltage on the load resistor R via an electrical conductor connected to the surface of the metal to be protected and to another terminal of the control circuit. This current I is converted to a voltage drop across R, which is input to a differential amplifier 12 of gain G. The differential amplifier output is the effective voltage "error signal" which is integrated by the operational amplifier 14 with time constant $\tau = R_1 C$. The small stand-off resistor $R_2$ depletes excess charge build-up on the feedback capacitor C to eliminate any possibility of integrator malfunction. The collected current is dissipated in the load resistor R. Electron depletion of the metal and IGSCC are defeated since electrons are forced to flow into the metal to compensate for those that would be lost by oxidation of the metal.

The apparatus shown in FIG. 1 has a power supply 20 which requires no external power source, but rather is energized by electrons (also referred to herein as β-particles) produced during nuclear decay. The source current $I_s$ (see FIG. 1) arises from the collection of nuclear decay electrons and produces a voltage across the source resistor $R_s$ which is a slowly decreasing function of time (because of the emitter decay). The Zener diode 24 and load resistor $R_L$ stabilize and limit the output voltage $B_+$, since the voltage drop across the diode is essentially the same for all reverse currents $I_z$ flowing through it in the breakdown region of the device. The voltage $B_+$ is regulated and stabilized, since large changes in diode current produce small changes in diode voltage. The resulting voltage across the load resistor $R_L$, due to the load current $I_L$, is insensitive to the β-emitter decay and can be used to power the active components in the control circuit.

In accordance with the foregoing teaching, the source of electrons was the decay of a radioactive isotope, depicted in FIG. 1 as a current source 22. For ease of handling and fabrication, the proposed isotope was a β-emitter (nuclear electrons) without decay γ-radiation. The following β-emitting isotopes were identified as being suitable candidates: $H^3$, $C^{14}$, $Si^{32}$, $Sr^{90}$ and $Ru^{106}$. The $Ru^{106}$ isotope was preferred because of its 368-day half-life and 39.4 keV β-ray. All these isotopes have a single decay mode with no prompt γ emissions.

However, further study of the table of isotopes has revealed that $Ru^{106}$ decays to $Rh^{106}$, which is both a β-emitter and a γ-emitter in its decay to stable $Pd^{106}$. A preferred β-emitter is one with adequate half-life for practical application and with no γ-emission in its decay chain. The avoidance of γ-emission serves to simplify handling and fabrication, and to reduce leakage currents.

SUMMARY OF THE INVENTION

The present invention is a stand-alone low-voltage direct current power supply, for use as a battery, which is energized by the decay of a radioactive isotope. During this decay, either α- or β-particles are emitted. The β-emitting radioactive decay is activated by exposing the battery to a substantial neutron flux, e.g., inside the neutron flux of a nuclear reactor core. After the β-emitting material has been activated, the battery can be installed inside the reactor, as needed, at a location which is not exposed to a substantial neutron flux, i.e., out of core.

The group of β-emitting radioactive isotopes which satisfy the criteria of adequate half-life and no γ-emission include the following additional isotopic candidates $Sn^{121}$, $Cs^{134}$, $Sm^{151}$, $Ra^{228}$ and $Tl^{204}$. In accordance with a preferred embodiment of the invention, the β-emitting radioisotope is thallium, which decays directly to the ground state of $Pb^{204}$ by 763-keV β-decay with no γ-emission. The resulting β particles are collected to form a current which can be used for various purposes inside a reactor.

DETAILED DESCRIPTION OF THE PREFERRED EMBODIMENTS

Figure 2A:
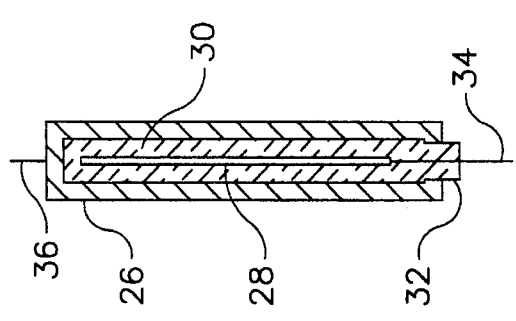
FIGS. 2A and 2B are elevation and plan sectional views respectively of a beta battery cell in accordance with the preferred embodiment of the invention.
Figure 2B:
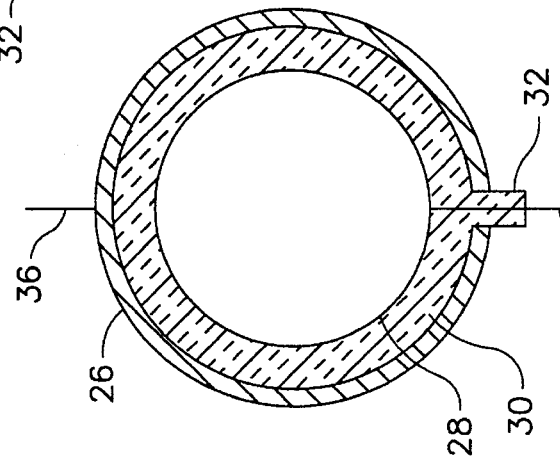
Figure 1:
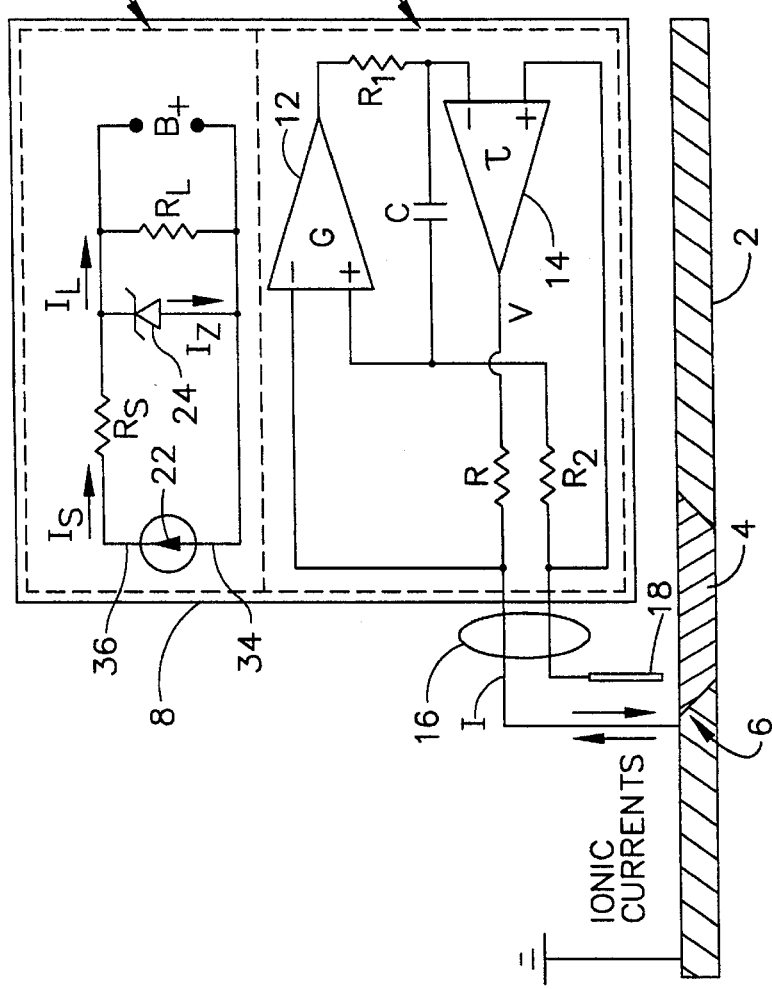
FIG. 1 is a schematic diagram of a self-contained IGSCC suppression system which is powered by a current source.

Referring to FIGS. 2A and 2B, the source assembly comprises a metallic collector 26 in the form of a hollow flat disk of metal containing the β-emitting isotope material 28, which is electrically isolated from the metallic collector 26 by ceramic stand-off 30 and ceramic feed-through 32. Preferably, the β-emitting isotope material 28 is centrally arranged inside the collector 26. A first electrical lead 34 is connected to the β-emitting material 28 and penetrates the ceramic stand-off 30. A second electrical lead 36 has an end connected to the metallic collector 26.

In accordance with one preferred embodiment, the β-emitting isotope material 28 is formed as a solid thin disk. Alternatively, the β-emitting isotope material 28 is deposited on a substrate formed as a solid thin disk, which substrate may be made of material which is not a β-emitter. Also, the ceramic material may be replaced by any other suitable electrically insulating material able to withstand the thermal and radiological conditions of the reactor environment.

In accordance with the preferred embodiment of the invention, the β-emitting radioisotope is thallium, which decays directly to the ground state of $Pb^{204}$ by 763-keV β-decay with no γ-emission. The resulting β-particles are collected by the collector 26 to form a current. The collector material could be nickel or a nickel-base alloy. The ceramics could be alumina to thermally match the metal. These are typical materials, but other possible combinations exist, which allow the device to operate reliably at reactor temperature.

In the collection process, x-rays are produced that may have to be shielded prior to reactor installation, although less than 1% of the electron energy is transformed into x-radiation that escapes to the environment. There is a small competing electron-capture reaction that is insignificant. The half-life of $Tl^{204}$ is 3.77 years, which is sufficient to provide adequate fabrication time, shelf-life and operational life. In its elemental form, thallium is a bluish metal with a specific gravity of 11.85 and a melting point higher than 303° C. All of its properties are adequate for the applications proposed herein.

Figure 3:
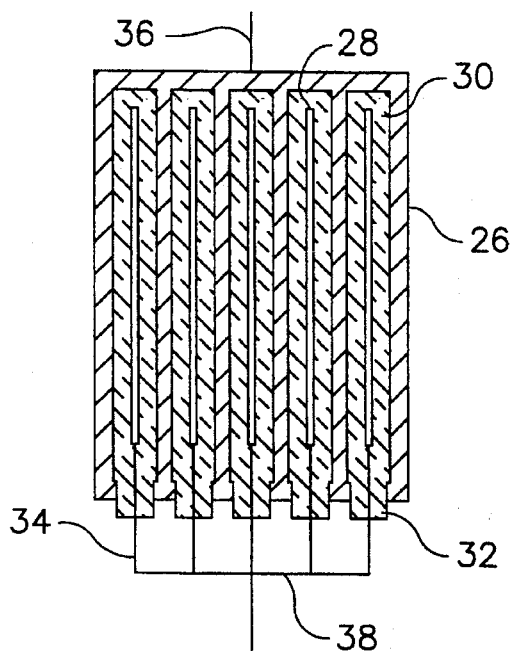
FIG. 3 is a schematic diagram of a 5-cell solid-state beta battery in accordance with another preferred embodiment of the invention.

In accordance with an alternative preferred embodiment of the present invention, the cell shown in FIGS. 2A and 2B may be replicated many times and connected together ("sandwiched") to provide adequate current for conversion to voltage in practical applications. FIG. 3 is a schematic representation of this configuration for five unit cells. However, the number of cells sandwiched together can be more or less than five.

The preferred embodiments of the β-battery of the invention have a very thin layer of low-density ceramic electroplated on every emitter surface, which is used as a substrate. Then, the ceramic surfaces are metallized and then electroplated with a metal having suitable electrical conductivity. The metal electroplated cells are then bonded together to form a multi-cell array, an example of which is seen in FIG. 3. In this array, the metallic collectors 26 separate each unit cell and form a bus to which electrical lead 36 is connected. The electrical leads 34 are connected to a bus 38. The feed-through ceramics and leads are also deposited by electrodeposition. Processes and techniques similar to those used in semiconductor device fabrication are available for manufacture of the device, with adequate care taken to shield emitter x-rays during fabrication.

The amount of current density j generated can be estimated from the following formula, which takes account of source decay and self-absorption:

$$j = N(\rho \Im/A\tau\mu)e^{-t/\tau}[1-e^{-\mu l}] \text{amp/cm}^2$$

where l is the emitter thickness; ρ is the emitter density; A is the emitter mass number; τ is the emitter mean-life (1.44$t_{1/2}$); $\Im$ is the Faraday constant (96487 coulomb/gm-mole); μ is the electron absorption coefficient of the emitter/insulator; and N is the number of cells;

Using the appropriate numbers for $Tl^{204}$, it turns out that about 100 cells, each with emitter diameter 10 cm and emitter thickness 0.5 mm, would produce 3.6 mA of current initially. If a dropping resistor of 3.35 kΩ were used to generate voltage, a peak voltage of 12 volts and initial steady power of 474 mW would result. If regulated to a maximum of 4 volts, the source would have a life of about 3 years. The total source package would be about 3.5 cm thick and 11 cm in outer diameter.

Figure 4:
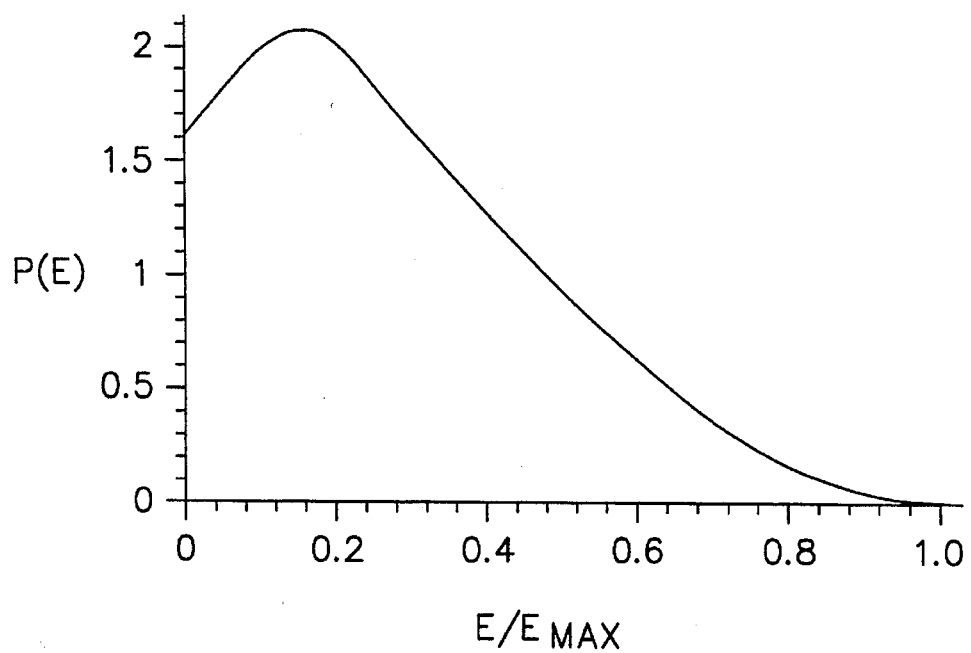
FIG. 4 is a graph of the β-decay spectrum for the $Tl^{204}$ radioisotope, wherein $E_{max}$ is the maximum β-decay energy and p(E) is the probability per unit energy of an electron emission event.

The spectrum of collected electrons is expected to look like the curve shown in FIG. 4, where $E_{max}$ is the maximum β-decay energy (763 keV for $Tl^{204}$) and p(E) is the probability per unit energy of an electron emission event. It is a characteristic of this type of emission that the shape of the spectrum is unchanged by the absorption process for thin emitters. The most probable electron energy is about 150 keV, and the area under the curve is unity. The x-rays are due primarily to the electrons around this energy.

A practical battery design requires thin cells with relatively large surface areas and efficient heat dissipation to assure adequate cooling of the collectors. The thickness of the thallium layers is limited by self-absorption of electrons inside the β-emitting material. The thallium layers can be deposited, by sputtering or electroplating, on both sides of a substrate material of sufficient thickness to assure structural integrity, For this example, the circuit to be driven by this source would have to dissipate about 200 mW in order that the battery have adequate life. Carefully designed, simple operational amplifier circuits can meet this requirement. Leakage currents would have to be virtually eliminated in the source design.

The preferred embodiments have been disclosed for the purpose of illustration only. Variations and modifications of those embodiments will be readily apparent to persons skilled in the art of battery design. For example, certain applications can be foreseen that require low DC currents directly, without conversion to voltage, such as cathodic protection of metals subject to corrosion. An α-emitting material (e.g., $Am^{241}$) may also be used in a manner entirely analogous to β-emitting material. All such variations and modifications are intended to be encompassed by the claims appended hereto.

We claim:

1. A method for powering an electrical circuit inside a nuclear reactor, comprising the steps of:

installing an electrical circuit inside a nuclear reactor;

selecting an isotopic material which has the property, when placed at a predetermined location within a neutron flux inside the nuclear reactor, or capturing neutrons from the neutron flux and being activated by neutron capture to a radioactive state having a subsequent decay chain during which at least one β-particle is emitted;

constructing a β-battery by placing a metallic collector in relationship to a mass of said selected isotopic material so that β-particles emitted by said selected isotopic material are collected;

placing said β-battery in an unactivated state at said predetermined location within the neutron-flux; and connecting said β-battery to said electrical circuit.

2. The method as defined in claim 1, wherein said selected isotopic material is an isotope of thallium.

3. A method for powering an electrical circuit inside a nuclear reactor, comprising the steps of:

installing an electrical circuit inside a nuclear reactor;

selecting an isotopic material which has the property, when placed at a predetermined location within a neutron flux inside the nuclear reactor, of capturing neutrons from the neutron flux and being activated by neutron capture to a radioactive state having a subsequent decay chain during which at least one β-particle is emitted;

constructing a β-battery by placing a metallic collector in relationship to a mass of said selected isotopic material so that β-particles emitted by said selected isotopic material are collected;

placing said β-battery in an unactivated state at said predetermined location inside the nuclear reactor for a duration of time sufficient to activate said selected isotopic material;

moving said activated β-battery to a different location in proximity to said electrical circuit; and connecting said β-battery to said electrical circuit.

4. The method as defined in claim 3, wherein said selected isotopic material is an isotope of thallium.

5. A method for supplying electrical current to a metal alloy component inside a nuclear reactor, comprising the steps of:

selecting an isotopic material which has the property, when placed at a predetermined location within a neutron flux inside the nuclear reactor, of capturing neutrons from the neutron flux and being activated by neutron capture to a radioactive state having a subsequent decay chain during which at least one negative β-particle is emitted;

constructing a β-battery by placing a metallic collector in relationship to a mass of said selected isotopic material so that negative β-particles emitted by said selected isotopic material are collected;

placing said β-battery in an unactivated state at said predetermined location within the neutron flux; and electrically connecting said β-battery and said metal component so that collected negative β-particles flow to said metal component.

6. The method as defined in claim 5, wherein said selected isotopic material is an isotope of thallium.

* * * * *